United States Patent [19] | [11] 4,186,121
Gangal | [45] Jan. 29, 1980

[54] PROCESS FOR OBTAINING COLLOIDAL DISPERSION OF POLYMERIC TETRAFLUOROETHYLENE

[75] Inventor: Subhash V. Gangal, Parkersburg, W. Va.

[73] Assignee: E. I. Du Pont de Nemours & Company, Wilmington, Del.

[21] Appl. No.: 916,917

[22] Filed: Jun. 19, 1978

[51] Int. Cl.$^2$ .............................................. C08L 27/18
[52] U.S. Cl. ................................ 260/29.6 F; 428/422; 526/87; 526/206; 526/207; 526/213; 526/255
[58] Field of Search .................... 526/74, 213, 255; 260/29.6 F

[56] References Cited

U.S. PATENT DOCUMENTS

| 2,398,926 | 4/1946 | Dorough | 526/255 |
|---|---|---|---|
| 2,750,350 | 6/1956 | Kroll | 526/255 |
| 2,965,595 | 12/1960 | Brinker et al. | 526/213 |
| 2,980,653 | 4/1961 | Johnson | 526/213 |
| 3,032,543 | 5/1962 | Bro et al. | 526/255 |
| 3,391,099 | 7/1968 | Punderson | 526/255 |
| 3,704,285 | 11/1972 | Porter | 526/255 |
| 3,707,519 | 12/1972 | Hahn | 526/255 |
| 4,016,345 | 4/1977 | Holmes | 526/255 |

FOREIGN PATENT DOCUMENTS 1397931 7/1972 United Kingdom .

OTHER PUBLICATIONS

Penwalt Lucidol Product Bulletin, Org. Peroxide Bulletin 3.101 (Jul., 1971).

Primary Examiner—Harry Wong, Jr.

[57] ABSTRACT

Presence of a selected carboxylic acid in the aqueous polymerization mixture during polymerization of tetrafluoroethylene to obtain a colloidal dispersion of polymeric tetrafluoroethylene has been found to reduce the amount of coagulum formed during the polymerization.

5 Claims, No Drawings

PROCESS FOR OBTAINING COLLOIDAL DISPERSION OF POLYMERIC TETRAFLUOROETHYLENE

FIELD OF THE INVENTION

This invention relates to an improvement in dispersion polymerization of tetrafluoroethylene.

BACKGROUND OF THE INVENTION

The homopolymerization of tetrafluoroethylene and the copolymerization of tetrafluoroethylene and ethylenically unsaturated comonomers in aqueous medium can be carried out by two distinctly different procedures. In one procedure, little or no dispersing agent is employed and agitation is carried out vigorously in order to produce a precipitated resin, commonly referred to as "granular" resin. In the other procedure, sufficient dispersing agent is employed and agitation is mild in order to produce small colloidal size particles dispersed in the aqueous reaction medium. In this second procedure, called aqueous dispersion polymerization, precipitation (i.e., coagulation) of the resin particles is avoided. The two procedures produce distinctly different products. The granular product can be molded in various forms, whereas the resin produced by the aqueous dispersion method cannot be molded but is fabricated by dispersion coating or by converting to powder for paste extrusion with a lubricating medium. In contrast, the granular resin is incapable of being paste extruded or dispersion coated.

A disadvantage which occurs during aqueous dispersion polymerization is the formulation of coagulum, i.e., unwieldy large clumps of resin particles, which settle out of the polymerization medium and may clog the equipment as well as reduce the yield of suspended, colloidal size resin particles. This coagulum formation is particularly evident when ionic polymerization initiators are employed. Several methods have been developed in the art to reduce the amount of coagulum formed. For example, Bankoff U.S. Pat. No. 2,612,484 teaches that selected hydrocarbon waxes can be added to the polymerization medium to stabilize the colloidal size resin particles produced and thereby prevent their premature coagulation. In addition, Punderson U.S. Pat. No. 3,391,099 teaches that if addition of dispersing agent to the reaction medium is programmed (i.e., added in increments), the nucleation of resin particles may be controlled so as to reduce formation of coagulum.

Despite the teachings of the art to reduce coagulum formation, further reduction of coagulum formation is desirable.

SUMMARY OF THE INVENTION

In this invention, formation of coagulum during polymerization of tetrafluoroethylene in an aqueous medium to obtain a colloidal dispersion of a tetrafluoroethylene polymer is reduced by carrying out the polymerization process in the presence of an aliphatic, substantially non-telogenic carboxylic acid having a $-\log K$ of between about 1.5 and 6.0.

DESCRIPTION OF THE INVENTION

The polymerization of tetrafluoroethylene, alone or with other polymerizable ethylenically unsaturated comonomers in aqueous medium to produce colloidal particles of tetrafluoroethylene polymer is well known in the art. Tetrafluoroethylene monomer, along with ethylenically unsaturated comonomer if desired, is typically admixed or contacted with an aqueous dispersion containing dispersing agent and polymerization initiator. Ordinarily, the monomer (or monomers) is introduced into the dispersion under pressure. Typical conditions include polymerization temperatures of 60°–120° C.; preferably 70°–100° C.; and pressures of 30–1000 psi (2.1 to 70 kg/cm$^2$), preferably 100–800 psi (7–58 kg/cm$^2$). The polymerization is ordinarily carried out in a gently stirred autoclave.

Initiators employed herein are ionic initiators. Examples of ionic polymerization initiators include inorganic persulfates such as ammonium persulfate or alkali metal persulfates such as potassium persulfate and the like. The initiator may be added prior to initiation of polymerization or may be added in increments throughout polymerization. The amount of initiator employed depends on the temperature of polymerization, the nature of the initiator, the molecular weight of the polymer desired, and the rate of reaction desired. Ordinarily, the amount is between 2.0 ppm to 270 ppm based on water present when the polymerization is carried out at about 60°–120° C.

The dispersing agent is an anionic, substantially non-telogenic dispersing agent. Commonly employed dispersing agents are fluorinated carboxylates containing 7–20 carbon atoms, such as ammonium polyfluorocarboxylates. The amount of dispersing agent present is ordinarily between about 800 ppm and about 4000 ppm based on weight of water employed in the aqueous dispersion. The dispersing agent may be added prior to initiation of polymerization or may be added in increments as described in Punderson U.S. Pat. No. 3,391,099.

If desired, a paraffin wax (i.e., a saturated hydrocarbon having more than 12 carbon atoms) that is liquid at the polymerization temperature may be employed as described in Bankoff U.S. Pat. No. 2,612,484. Usually, the wax is employed in an amount between 0.1%–12% by weight of water in the aqueous dispersion.

Tetrafluoroethylene is either employed alone (to produce the homopolymer, polytetrafluoroethylene) or is employed with at least one other copolymerizable, ethylenically unsaturated comonomer. The amount of comonomer employed will depend upon the properties desired in the polymer particles obtained. Ordinarily the amount of comonomer employed in the process of this invention will not be so great as to result in tetrafluoroethylene copolymers having more than 35% by weight of comonomer units. (If more than 35% is used, the copolymer tends to lose its nonelastomeric nature). As is known in the art, as the comonomer content increase, the tetrafluoroethylene copolymers tend to become melt-processible. The polymers useful herein include both melt-processible and non-melt-processible polymers. The amount of comonomer that causes the copolymer to become melt-processible depends upon its molecular weight and thus varies from comonomer to comonomer. Copolymers in which the amount of comonomer is not sufficient to cause the comonomer to be melt-processible are disclosed in Cardinal U.S. Pat. No. 3,142,665; while copolymers in which the amount of comonomer is sufficient to cause the comonomer to be melt-processible are disclosed in Bro et al. U.. Pat. No. 2,946,763 and Harris et al. U.S. Pat. No. 3,132,123. Especially perfered comonomers, whether the resulting copolymer is melt-processible or non-melt-processible, are perfluoro (terminally unsaturated olefins) of 3–7 carbon atoms such as hexafluoropropylene, and perfluoro (alkyl vinyl ethers) of 3–7 carbon atoms such as perfluoro (n-propyl vinyl ether).

Polymerization is effected by mixing the foregoing described ingredients under the conditions specified above. Mixing is ordinarily carried out by mildly agitating the aqueous polymerization mixture. Agitation is controlled to aid in preventing premature coagulation of resin particles produced in the polymerization. Polymerization is ordinarily conducted until the solids level (i.e., polymer content) of the aqueous mixture is between about 15 and 60 percent by weight of the mixture.

The aliphatic, substantially non-telogenic, carboxylic acid contains 1–6 carbon atoms and is one having a $-\log K$ of between about 1.5 and 6.0, preferably between 2.5 and 5.5. The term K represents the dissociation constant of the acids. In the case of acids with two or more carboxyl groups, K is the first dissociation constant. It has been found that when $-\log K$ is below about 1.5, the acids tends to become too strong, while above about 6.0 the acids tend to be too weak. The acid may contain more than 1, e.g., 2 or 3 carboxyl groups and may contain several, e.g., 1 or 2 or 3, non-telogenic substituents, such as hydroxyl. Preferably the aliphatic group is an alkyl or alkylene group. Most preferably the acid is an alkylene dicarboxylic acid, containing between 3 and 6 carbon atoms. Representative acids include malonic, succinic, adipic, citric, acetic, glutaric, formic, and hydroxyacetic acids.

The acid employed should preferably be present in an amount between about 10 and about 150 times the amount of initiator present based on weight. More preferably the acid will be present in an amount between about 10 and about 50 times the amount of initiator. The acid employed is added prior to initiation of polymerization or can be added intermittently or continuously during the course of the polymerization. When the acid is added intermittently or continuously, the resin produced in the polymerization has a lower extrusion pressure than a resin produced by adding all the acid initially.

By the term "substantially non-telogenic" used in the definition of the acid and dispersing agent is meant that the polymer produced has an SSG (standard specific gravity) substantially the same as the SSG of a polymer produced without the acid or dispersing agent present. SSG is a means of measuring the molecular weight of the polymer produced and is measured as described in U.S. Pat. No. 4,016,345, column 7.

The dispersions produced herein are of the same quality and are useful in the same manner as aqueous dispersions of tetrafluoroethylene polymers known heretofore. For example, the dispersions are useful in making coated articles in which the dispersion is applied to a substrate by spraying, coating or dipping to obtain heat-resistant materials. The dispersions are also useful for conversion to fine powder for paste extrusion applications.

The Examples hereinbelow describe the invention in greater detail.

POLYMERIZATION PROCEDURE USED IN EXAMPLES 1–8 AND COMPARISONS THEREWITH

A horizontally disposed, water/steam jacketed, cylindrical stainless-steel autoclave located in a barricade and having a capacity of 36,240 cc and a length-to-diameter ratio of about 1.5 to 1, and provided with a 4-bladed cage-type agitator rotated at 46 rpm and running the length of the autoclave, was evacuated and then charged with 855 grams of paraffin wax, 21.8 kg of demineralized water, and 3.0 grams of ammonium perfluorocaprylate (C-8 APFC) dispersing agent. The autoclave was then heated to 88° C., evacuated and purged with tetrafluoroethylene, after which 0.20 g ammonium persulfate initiator (9.2 ppm) (APS) dissolved in water was added. Then 25 ml of hexafluoropropylene (HFP) was pumped in, and the autoclave was pressured over a period of about 2 minutes to 25.6 kg/cm$^2$ absolute with tetrafluoroethylene (TFE). Stirring rate and temperature were maintained until polymerization started as evidenced by 0.7 kg/cm$^2$ drop in pressure. The temperature was immediately raised to 90° C. where it was maintained throughout the polymerization. Additional TFE was then added to maintain the reaction pressure at 25.6 kg/cm$^2$ until a dispersion of approximately 35 percent solids content (total polymer plus aqueous medium basis) was obtained. After about 1360 grams of TFE had been fed following start of the reaction (4.4 percent solids formed), 1000 ml of 2.7 percent by weight aqueous solution of C-8 APFC dispersing agent was injected continuously at 25 ml/minute into the autoclave to stabilize the dispersion. The TFE feed to the autoclave was terminated after 11,804 grams of TFE was fed, and the pressure was allowed to decrease to 12.3 kg/cm$^2$ before agitation was stopped and the vapor space of the reactor was vented. The polymerization time from start-up to the time feed was turned off was 57 minutes.

The resulting dispersion was discharged from the autoclave and cooled, after which the supernatant solid paraffin wax was removed.

Comparative Experiment

A. Following the Polymerization Procedure, about 75% of the polymer had prematurely coagulated to form useless coagulum.

B. Following the Polymerization Procedure, except that potassium persulfate initiator was used instead of ammonium persulfate initiator and reaction time was 46 minutes, over half the polymer solids had prematurely coagulated to form coagulum.

EXAMPLE 1

Following the Polymerization Procedure, except that reaction time was 194 minutes and 5 g succinic acid (229 ppm) was added prior to reaction, no visible amount of coagulum was present in the resulting dispersion.

EXAMPLE 2

Following the Polymerization Procedure, except that 0.25 g potassium persulfate (11.5 ppm) initiator was used instead of 0.20 g ammonium persulfate and the reaction time was 108 minutes and 5 g succinic acid was added prior to reaction, no visible amount of coagulum was present in the resulting dispersion.

EXAMPLE 3

Following the Polymerization Procedure, except that 0.30 g ammonium persulfate (13.8 ppm) initiator was used instead of 0.20 g, a polymerization temperature of 85° C. was employed, reaction time was 50 minutes and 5 g malonic acid (229 ppm) was added prior to reaction, no visible amount of coagulum was present in the resulting dispersion.

EXAMPLE 4

Following the Polymerization Procedure as modified in Example 3, except that 5 g of glutaric acid (229 ppm) was employed instead of 5 g of malonic acid and reaction time was 140 minutes, no visible amount of coagulum was present in the resulting dispersion.

EXAMPLE 5

Following the Polymerization Procedure as modified in Example 3, except that 5 g of adipic acid (229 ppm) was employed instead of 5 g of glutaric acid, reaction time was 250 minutes, and 29.2 kg/cm² pressure was used, no visible amount of coagulum was present in the resulting dispersion.

COMPARISON WITH EXAMPLE 5

When 5 g oxalic acid (229 ppm) was used in Example 5 instead of adipic acid, over 25% of the polymer solids had prematurely coagulated to form coagulum. The −log K of oxalic is too low for use in this invention.

EXAMPLE 6

Following the Polymerization Procedure, except that 0.08 g ammonium persulfate (3.7 ppm) was used instead of 0.20 g, no HFP was present, the polymerization pressure was 29.2 kg/cm², reaction time was 60 minutes, and 5 g succinic acid was added prior to reaction, no visible amount of coagulum was present in the resulting dispersion.

EXAMPLE 7

Following the Polymerization Procedure, except that 0.1 g ammonium persulfate (4.6 ppm) initiator was used instead of 0.2 g, the polymerization pressure was 29.2 kg/cm², the reaction time was 34 minutes, no HFP was present, and 5 g citric acid (229 ppm) was added prior to reaction, no visible amount of coagulum was present in the resulting dispersion.

EXAMPLE 8

Following the Polymerization Procedure, except that 0.06 g ammonium persulfate (2.8 ppm) initiator was used instead of 0.2 g, the polymerization pressure was 29.2 kg/cm², the reaction time was 61 minutes, no HFP was used, and 5 ml acetic acid was added prior to reaction, no visible amount of coagulum was present in the resulting dispersion.

EXAMPLE 9

The Polymerization Procedure was followed, except that 0.15 g (6.9 ppm) ammonium persulfate was employed, 10 g succinic acid (458 ppm) was used, the reaction time was 86 minutes, and the succinic acid was added as described below. No visible coagulum was observed in the resulting dispersion.

A. When all the succinic acid was added prior to initiation of the reaction, the extrusion pressure of a coagulate sample of the resin prepared was 9488 psi at a reduction ratio of 1600/1.

B. When all the succinic acid was slowly added continuously during a portion of the 86 minute reaction time along with the additional C-8 APFC, the extrusion pressure of a coagulated sample of the resin prepared was 6920 psi at a reduction ratio of 1600/1.

Coagulation was by achieved by rapidly agitating the dispersion and extrusion was carried out with an extruder at a reduction ratio of 1600/1. employing 18½% by weight of a hydrocarbon lubricant.

TABLE I

The reaction conditions and the results of the Comparative Experiments and of Examples 1-9 are summarized in Table I as follows:

TABLE I

|  | Comonomer | Reaction Temp. °C. | Reaction Pressure (Kg/cm²) | Reaction Time (min.) |
|---|---|---|---|---|
| Comp. Expt. A | 25 ml HFP | 90 | 25.6 | 57 |
| Comp. Expt. B | 25 ml HFP | 90 | 25.6 | 46 |
| Ex. 1 | 25 ml HFP | 90 | 25.6 | 194 |
| Ex. 2 | 25 ml HFP | 90 | 25.6 | 108 |
| Ex. 3 | 25 ml HFP | 85 | 25.6 | 50 |
| Ex. 4 | 25 ml HFP | 85 | 25.6 | 146 |
| Ex. 5 | 25 ml HFP | 85 | 29.2 | 250 |
| Ex. 6 | None | 90 | 29.2 | 60 |
| Ex. 7 | None | 90 | 29.2 | 34 |
| Ex. 8 | None | 90 | 29.2 | 61 |
| Ex. 9 | 25 ml HFP | 90 | 25.6 | 86 |

|  | Initiator g (ppm) | Acid** Present | Coagulum Formed* |
|---|---|---|---|
| Comp. Expt-A | 0.20(9.2)APS | None | 2126 g |
| Comp. Expt-B | 0.20(9.2)KPS | None | 6537 g |
| Ex. 1 | 0.20(9.2)APS | 5 g succinic | — |
| Ex. 2 | 0.25(11.5)KPS | 5 g succinic | — |
| Ex. 3 | 0.30(13.8)APS | 5 g malonic | — |
| Ex. 4 | 0.30(13.8)APS | 5 g glutaric | — |
| Ex. 5 | 0.30(13.8)APS | 5 g adipic | — |
| Comp. Ex. 5 | 0.30(13.8)APS | 5 g oxalic | coagulum formed |
| Ex. 6 | 0.08(3.7)APS | 5 g succinic | — |
| Ex. 7 | 0.10(4.6)APS | 5 g citric | — |
| Ex. 8 | 0.06(2.8)APS | 5 ml acetic | — |

TABLE I-continued

| Ex. 9 | 0.15(6.9)APS | 10 g succinic | — |

\* - means no coagulum was observed
APS is ammonium persulfate; KPS is potassium persulfate
HFP is hexafluoropropylene; Comp. means Comparative
Ex. is Example;
\*\* is 5g=229 ppm and 10g=458 ppm.

EXAMPLE 10

A polymerization autoclave was charged with 18.1 kg of demineralized water and 5 g of ammonium perfluorocaprylate (C-8 APFC), evacuated and purged with TFE. The polykettle temperature was raised to 95° C. and the agitator was turned on at 46 rpm. The polykettle was pressured up to 20.0 kg/cm² absolute with hexafluoropropene (HFP) and then to 29.2 kg/cm² absolute with TFE. A relatively large amount of polymerization initiator (5.1 g, 234 ppm, ammonium persulfate dissolved in water) was added to kick off the polymerization and thereafter initiator (potassium persulfate) was added slowly (64 mg/min) to maintain the desired persulfate level. Kickoff or polymerization startup was indicated by a 0.7 kg/cm² drop in pressure. The temperature was held at 95° C. and the autoclave pressure was maintained at 29.2 kg/cm² by the addition of TFE throughout the polymerization. The agitator speed was varied to maintain a relatively constant rate of monomer absorption into the liquid and thus a constant rate of polymerization. After 5902 g of TFE had been charged from kickoff (130 minutes), the agitator was shut off and the autoclave was cooled. The autoclave was vented slowly to about 1.1 kg/cm² pressure and then purged with nitrogen. The polymer dispersion was then discharged from the autoclave and cooled. Non-water-wet polymer fluff which was floating on the dispersion or was found in the opened autoclave was dried and weighed.

A. When the above procedure was followed (i.e., no carboxylic acid additive was present), 1500 g of fluff had prematurely formed in the polykettle.

A-1. With the same procedure, except that 10 g of succinic acid (458 ppm) was added prior to reaction and the reaction time was 180 minutes, only 225 g of fluff prematurely formed.

B. When the Example 10 procedure was followed (i.e., no carboxylic acid additive was present), except that 50 g of C-8 APFC dispersing agent were added, a total of 7536 g of TFE were added, and the polymerization time was 165 minutes, 89 g of fluff had prematurely formed.

B-1. Under the same conditions as in B except that 20 g of succinic acid (916 ppm) was added prior to reaction, only 42 g of fluff prematurely formed.

The melt-processible copolymers used in these Example 10 experiments contained about 11 mole % HFP.

The $-\log K$ values of acids used in the foregoing Examples are listed as follows:

| | |
|---|---|
| Succinic | 4.19 |
| Adipic | 4.43 |
| Citric | 3.06 |
| Malonic | 2.85 |
| Oxalic | 1.19 |
| Glutaric | 4.34 |

In experiments carried out generally similar to the procedure described in the Polymerization Procedure, the following acids were used with the results obtained as shown in Table II:

TABLE II

| Acid | -logk | Results |
|---|---|---|
| Sulfuric | 0.4 | Coagulum observed |
| Phosphoric | 2.12 | Coagulum observed |
| Benzoic | 4.20 | No reaction |
| Acetic | 4.70 | No coagulum observed |

I claim:

1. In a process for obtaining a colloidal dispersion of polytetrafluoroethylene by polymerizing tetrafluoroethylene in an aqueous medium in the presence of an anionic, substantially non-telogenic fluorinated carboxylate dispersing agent containing 7–20 carbon atoms, and an ionic initiator, present initially in a amount of between about 2 and 270 ppm (based on water present), and at a temperature of between about 60° C. and 120° C. and at a pressure of between about 30 and 1000 psi, the improvement which comprises reducing formation of coagulum by employing in the aqueous medium an aliphatic, substantially non-telogenic carboxylic acid selected from the group consisting of malonic acid, succinic acid, adipic acid, acetic acid, glutaric acid, formic acid and hydroacetic acid, said acid being present in an amount between 10 and 150 times the amount of initiator present based on weight.

2. Process of claim 1 wherein the acid is present in an amount 10 to 50 times greater than the amount of initiator present based on weight.

3. Process of claim 1 wherein the acid is citric acid.

4. Process of claim 1 wherein the acid is acetic acid.

5. In a process for obtaining a colloidal dispersion of polymeric tetrafluoroethylene by polymerizing tetrafluoroethylene and at least one other copolymerizable, ethylenically unsaturated comonomer present in an amount sufficient to provide up to 35% by weight of the copolymer in an aqueous medium in the presence of an anionic, substantially non-telogenic fluorinated carboxylate dispersing agent containing 7–20 carbon atoms, and an ionic initiator, present initially in an amount of between about 2 and 270 ppm (based on water present), and at a temperature of between about 60° C. and 120° C. and at a pressure of between about 30 and 1000 psi, the improvement which comprises reducing formation of coagulum by employing in the aqueous medium an aliphatic, substantially non-telogenic carboxylic acid selected from the group consisting of malonic acid, succinic acid, adipic acid, citric acid, acetic acid, glutaric acid, formic acid and hydroacetic acid, said acid being present in an amount between 10 and 150 times the amount of initiator present based on weight.

* * * * *